United States Patent [19]

Gross

[11] 4,342,245
[45] Aug. 3, 1982

[54] COMPLEX WAVEFORM GENERATOR FOR MUSICAL INSTRUMENT

[75] Inventor: Glenn M. Gross, Chicago, Ill.

[73] Assignee: Norlin Industries, Inc., White Plains, N.Y.

[21] Appl. No.: 238,764

[22] Filed: Feb. 27, 1981

Related U.S. Application Data

[63] Continuation of Ser. No. 88,551, Oct. 26, 1979, abandoned.

[51] Int. Cl.³ .......................... G10H 1/06; G10H 7/00
[52] U.S. Cl. ...................................... 84/1.01; 84/1.11; 84/1.19
[58] Field of Search ....................... 84/1.01, 1.03, 1.11, 84/1.13, 1.19, 1.22, 1.24, 1.25, 1.26; 307/271

[56] References Cited

U.S. PATENT DOCUMENTS

| | | | |
|---|---|---|---|
| 3,763,364 | 10/1973 | Deutsch et al. | 84/1.03 X |
| 3,978,755 | 9/1976 | Woron | 84/1.24 |
| 3,979,996 | 9/1976 | Tomisawa et al. | 84/1.25 |
| 4,000,675 | 1/1977 | Futamase et al. | 84/1.01 |
| 4,023,454 | 5/1977 | Obayashi et al. | 84/1.01 |
| 4,036,096 | 7/1977 | Tomisawa et al. | 84/1.01 |
| 4,084,472 | 4/1978 | Niimi | 84/1.01 |
| 4,109,208 | 8/1978 | Tomisawa et al. | 307/271 X |
| 4,176,577 | 12/1979 | Yamada et al. | 84/1.01 |
| 4,200,021 | 4/1980 | Chibana | 84/1.22 |

*Primary Examiner*—Stanley J. Witkowski
*Attorney, Agent, or Firm*—Ronald J. Kransdorf; Jack Kail

[57] ABSTRACT

A tone source apparatus for an electronic musical instrument includes a sequentially addressable memory storing a plurality of waveform segment defining instructions, each instruction including a component representative of the amplitude variation, the time duration and the direction of change of the associated waveform segment. Output means comprising an adder-subtractor circuit and a latch is operated for accumulatively processing the stored amplitude variation representative components for producing a stepped output signal whose direction of slope is determined by the stored direction component. Control means interposed between the memory and the output means is selectively operable for modifying the stored amplitude variation components coupled to the output means for imparting a sinusoidal inflection to the stepped output signal.

25 Claims, 20 Drawing Figures

FIG. 1
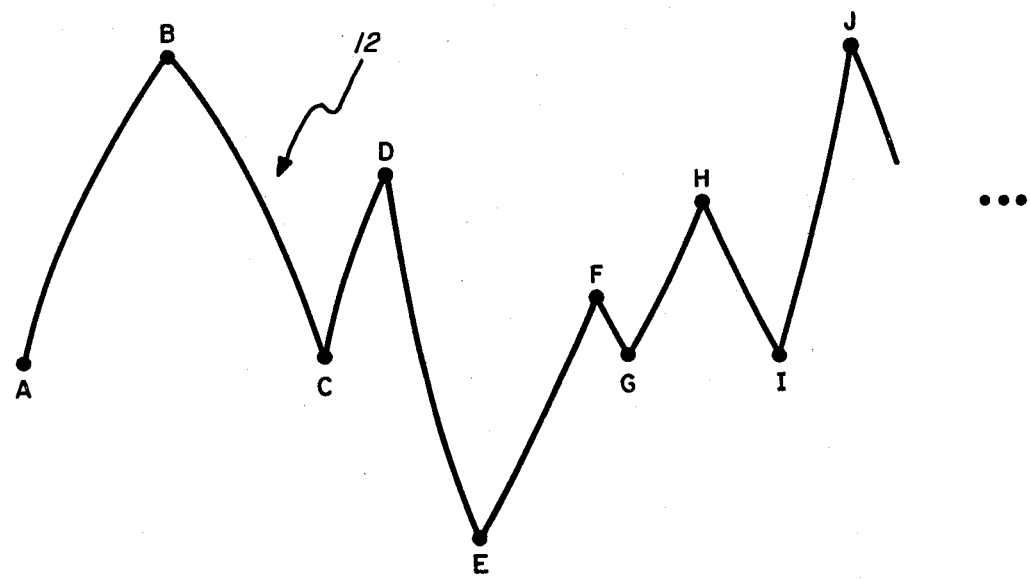
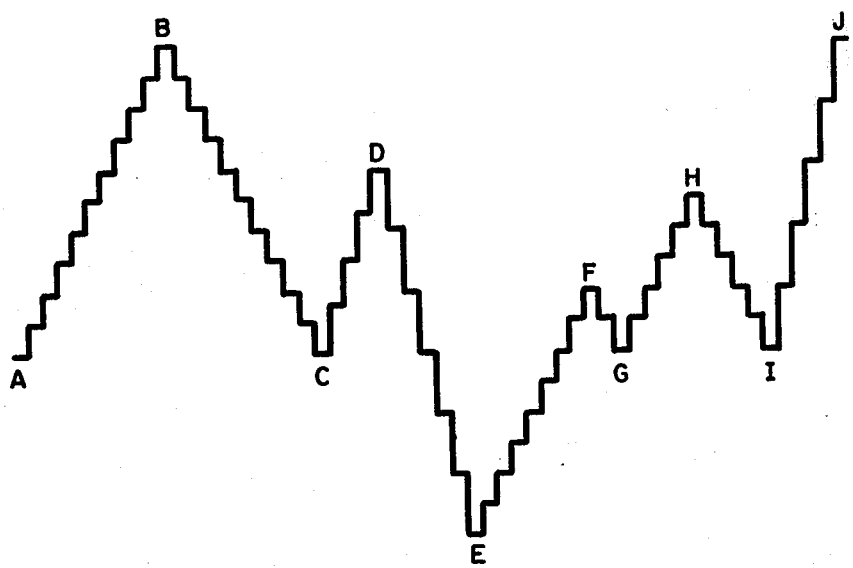
FIG. 6

| MEMORY ADDRESS | SEGMENT | NO./STEPS | STEP SIZE | DIRECTION |
|---|---|---|---|---|
| 01 | A-B | 01010 | 0010 | 0 |
| 02 | B-C | 01010 | 0010 | 1 |
| 03 | C-D | 01000 | 0011 | 0 |
| 04 | D-E | 00110 | 0100 | 1 |
| 05 | E-F | 01000 | 0010 | 0 |
| 06 | F-G | 00010 | 0010 | 1 |
| 07 | G-H | 00101 | 0010 | 0 |
| 08 | H-I | 00101 | 0010 | 1 |
| 09 | I-J | 00101 | 0100 | 0 |
| ⋮ | ⋮ | ⋮ | ⋮ | ⋮ |

FIG. 4
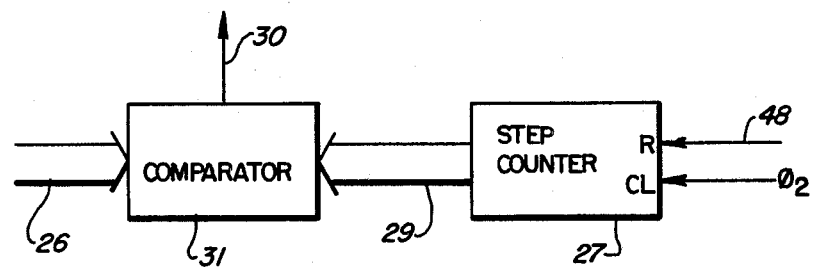
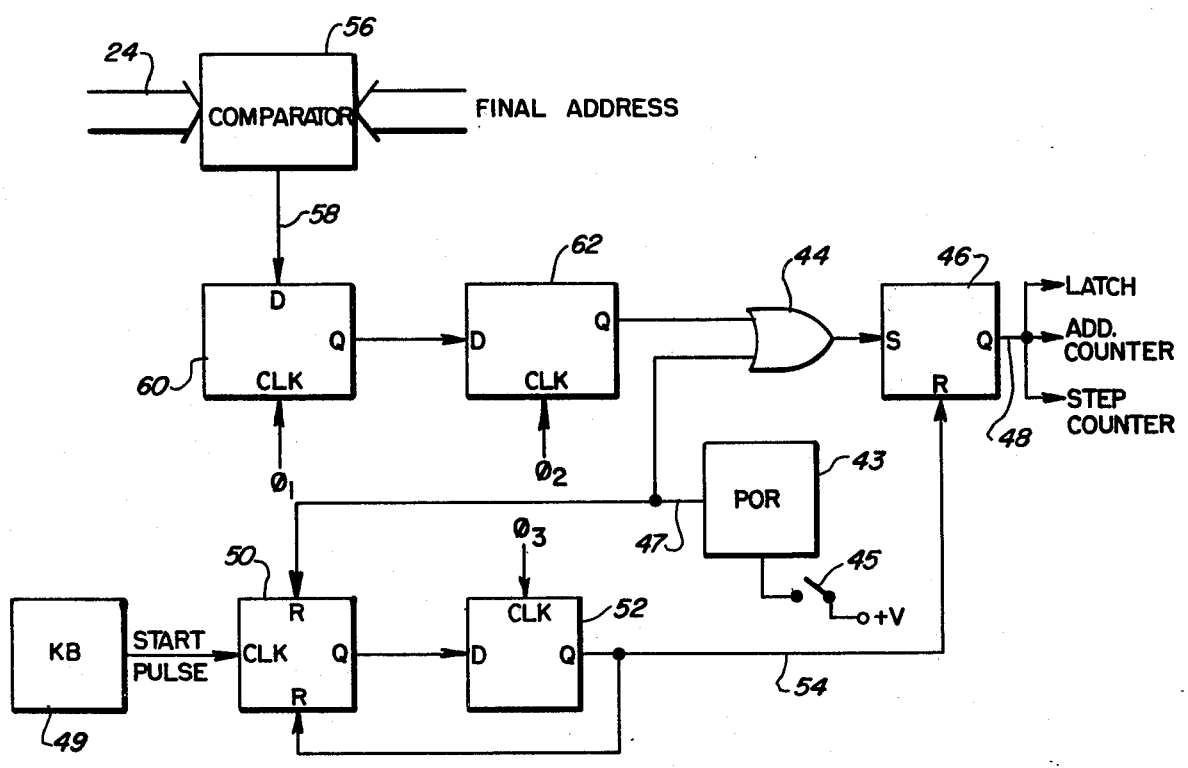
FIG. 7

| INPUT ADDRESS ON BUS 32 | OUTPUT STEP SIZE ON BUS 32' |
|---|---|
| 000000 | 0000 0000 |
| 000001 | 0000 0001 |
| 000010 | 0000 0010 |
| 000011 | 0000 0011 |
| 000100 | 0000 0100 |
| 000101 | 0000 0110 |
| 000110 | 0000 1000 |
| 000111 | 0000 1010 |
| ⋮ | ⋮ |

| MEMORY ADDRESS | MODE | A | B | C | D | E |
|---|---|---|---|---|---|---|
| 100 | CONVEX | 0 | 0 | 1 | 0 | 0 |
| 101 | CONCAVE | 1 | 1 | 1 | 1 | 0 |
| 110 | HALF-WAVE | 0 | 0 | 0 | 1 | 1 |
| 111 | "S-CURVE" | 1 | 1 | 0 | 0 | 0 |
| 0XX | LINEAR | 0 | 0 | 1 | 0 | 0 |

| ADDRESS FROM GATE 150 | MULTIPLICATION FACTOR |
|---|---|
| 1111 | 1.000 |
| 1110 | 0.750 |
| 1100 | 0.500 |
| 1000 | 0.250 |
| 0000 | 0.125 |

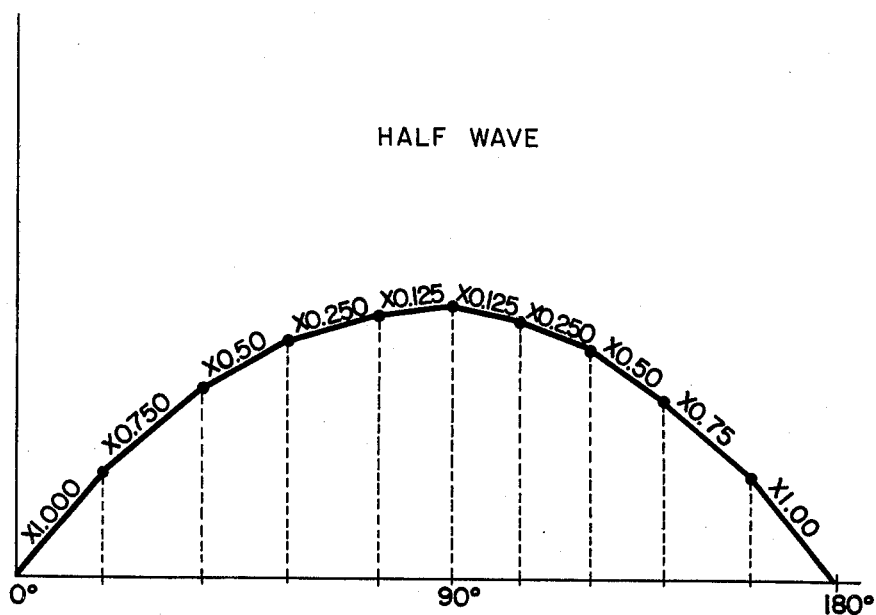
FIG. 18
FIG. 19
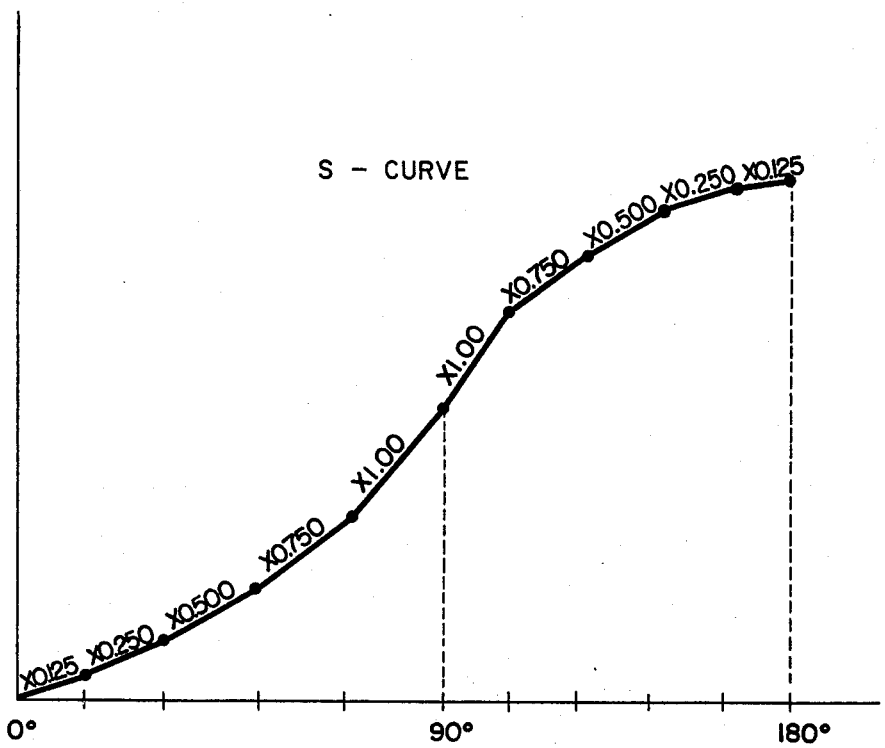

COMPLEX WAVEFORM GENERATOR FOR MUSICAL INSTRUMENT

This application is a continuation of application Ser. No. 088,551, filed Oct. 26, 1979, and now abandoned.

BACKGROUND OF THE INVENTION

This invention relates generally to electronic musical instruments and, more particularly, to an improved tone source apparatus for constructing musical waveforms on the basis of a set of instructions stored in a memory.

For purposes of the present invention, electronic musical instruments may be categorized as comprising one of two general types. The older of these two types consists of those instruments which use various types of oscillators or clock sources as the ultimate source of a musical waveform. In instruments of this type the spectral characteristics (e.g. harmonic content, etc.) of the generated waveform is inherently limited by the electrical characteristics of the source and of various modification circuits which are used to filter the waveform. The second type of musical instrument, which is of considerably more recent vintage, uses a suitably programmed memory as the ultimate source of the musical waveforms. In instruments of the latter type, a musical waveform is typically stored in a digital memory in amplitude sampled form and read out of the memory at a constant rate in response to an address counter whereupon it is converted to an analog form by a digital to analog converter. Although this approach allows considerable flexibility in generating musical waveforms, in that it permits any waveform to be produced by storing a representation thereof in terms of a succession of spaced amplitude samples, it is also subject to the disadvantage of excessive demands for memory capacity under certain circumstances. Thus, if the waveform to be generated is of long duration, from several to as many as thirty seconds, then the number of stored amplitude samples is too great to be stored economically, and without special techniques, the memory cost becomes prohibitive.

A technique used heretofore, see U.S. Pat. No. 4,023,454 to Obayashi et al, for reducing this memory capacity requirement involves dividing a musical waveform into a plurality of segments and storing a respective set of instructions at each of a plurality of memory addresses from which the waveform segments may be regenerated in approximate form. More specifically, in the Obayashi et al apparatus, each segment of a waveform is represented in memory by the coefficients and constants necessary to define an nth degree equation approximating the respective waveform segment. A linear approximation of the waveform segments is produced by storing the data for defining a first degree equation while variously contoured approximations of the waveform segments are produced by storing data for defining higher degree equations. Regardless of the degree of the equation stored in memory, each generated waveform segment is produced by multiplying the stored equation coefficients by a constantly increasing time factor and then appropriately combining the individual products with the stored constant to produce a stepped signal approximating the waveform segment. It will be appreciated that the memory capacity requirements in such a system may be significantly less than in an amplitude sampled system since one set of stored instructions may be used to define an entire waveform segment rather than a single amplitude sample.

SUMMARY OF THE INVENTION

The present invention provides an improvement over the prior art by additively or subtractively accumulating data represented by a stored amplitude variation representative instruction for generating a stepped output signal approximating a desired waveform segment. A sinusoidal inflection may be imparted to the output signal without using look-up tables by means interposed between the source of stored data and the accumulating means for selectively modifying the amplitude variation representative instructions coupled thereto.

More particularly, the tone source apparatus of the invention comprises a source of clock pulses having a period defining a unit time interval and a memory having a plurality of sequentially addressable memory locations each storing an instruction defining a waveform segment. Each stored instruction comprises first, second and third sub-instructions representing, respectively, the time duration measured in terms of unit time intervals, the amplitude variation per unit time interval and the direction of slope of the associated waveform segment. The memory is accessed by an address counter which is responsive to a coincidence means, the coincidence means generating a signal for clocking the address counter, thereby accessing the next sequential instruction stored in the memory, upon the occurrence of a number of unit time intervals equal to the value of the currently accessed first sub-instruction. The amplitude variation representative second sub-instruction is coupled to one input of an adder-subtractor circuit whose mode of operation is determined by the third sub-instruction. The output of the adder-subtractor circuit is coupled to the data input of a latch, the output of the latch being coupled back to the second input of the adder-subtractor circuit. In operation, the amplitude variation data represented by the second-instruction is accumulatively increased or decreased at the output of the latch in a number of steps determined by the first sub-instruction. The resulting stepped signal provides a linear approximation of the waveform segment represented by the stored instruction. In another embodiment of the invention, a control circuit may be interposed between the memory and the adder-subtractor circuit for selectively reducing the value of the second sub-instruction coupled to the adder-subtractor circuit whereby a desired inflection, e.g. sinusoidal, may be imparted to the stepped output signal without the use of look-up tables.

BRIEF DESCRIPTION OF THE DRAWINGS

FIG. 1 illustrates an exemplary analog musical tone waveform which may be approximated by the tone generator of the present invention.

FIG. 4 is a block diagram illustrating the construction of the coincidence circuit shown generally in FIG. 2.

FIG. 6 shows the stepped signal produced at the output of the latch of FIG. 2 when the tone generator is operated for approximating the waveform of FIG. 1.

FIG. 7 is a block diagram of a reset circuit used in association with the tone generator of FIG. 2.

FIGS. 16–19 illustrate different sinusoidally curved tone output signals producable by the tone generator of FIGS. 10 and 12.

DESCRIPTION OF THE PREFERRED EMBODIMENT

Figures 2, 3:
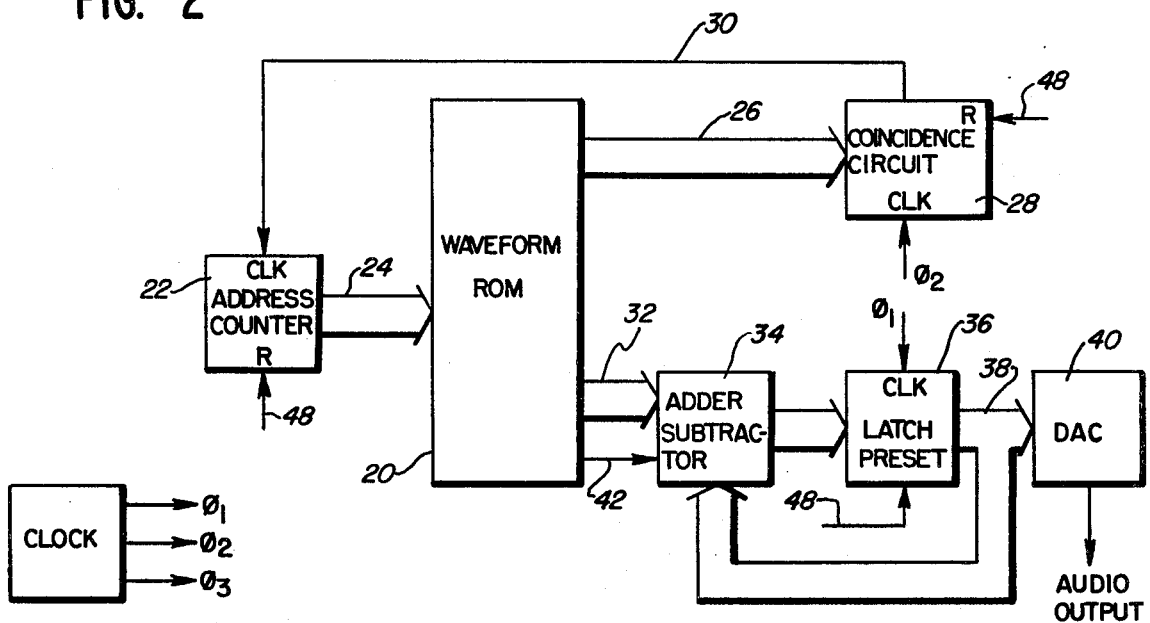
FIG. 2 is a block diagram depicting the linear embodiment of the tone generator of the invention.
FIG. 3 is a table illustrating the method of programming the waveform ROM shown in FIG. 2.

Referring now to the drawings, FIG. 1 illustrates a typical musical tone waveform which comprises a complex non-recurring audio signal having a time duration which may last for hundreds of miliseconds or more. The tone generator apparatus of the invention is adapted for producing a tone signal approximating the waveform 12, or other generally similar musical tone waveforms, by sequentially reconstructing certain recurring functions characterizing the waveform. More particularly, as shown in FIG. 1, the waveform 12 may be broken into a plurality of adjacent or contiguous segments such as segments A-B, B-C, C-D, etc. Each of these waveform segments may be approximated by a certain recurring function such as a linear straight line segment, a sinusoidal segment, or an exponential segment. The waveform 12 may then be reconstructed as a tone signal by reading from a memory a sequential set of instructions each defining or specifying a respective waveform segment approximation. Quite advantageously, this technique of storing waveform segment instructions rather than individual amplitude samples results in a considerable reduction in memory capacity requirements.

FIG. 2 illustrates a circuit constructed according to the invention adapted for generating a tone signal approximating a musical tone waveform, such as waveform 12, in terms of a series of piecewise linear segments. That is, in relation to the waveform 12 of FIG. 1, the tone signal produced by the tone generator of FIG. 2 comprises a first straight line segment approximating segment A-B of the waveform 12, a second straight line segment approximating the segment B-C of the waveform 12, a third straight line segment approximating the segment C-D of the waveform 12, and so on.

Referring now in detail to FIG. 2, the illustrated tone generator includes a waveform ROM (read only memory) 20 addressed by an address counter 22 over an address bus 24. The method of programming the waveform ROM 20 is shown in the table of FIG. 3. In FIG. 3, each segment of the waveform 12 is identified by an instruction stored at a respective memory address. For example, the instruction defining waveform segment A-B is stored at memory address 01, the instruction defining waveform segment B-C at memory address 02, the instruction defining waveform segment C-D at memory address 03, and so on. Each of the instructions defining a particular waveform segment actually comprises three separate sub-instructions. The first sub-instruction, Number of Steps, specifies the time duration of the associated segment in terms of a number of unit time intervals. In other words, the first sub-instruction specifies the number of steps along the X-axes occupied by the waveform segment. Referring to waveform 12, it will be seen that segment A-B is characterized by a time duration of ten unit time intervals or, stated otherwise, occupies ten steps measured along the X-axes. Therefore, the first sub-instruction stored at memory address 01 is 01010 (decimal ten). The second sub-instruction, Step Size, relates the amplitude variation of the waveform segment to the unit time interval. Segment A-B of waveform 12 is characterized by an amplitude variation per unit time interval, i.e. the step size, equal to $20 \div 10$, which quotient (2) is stored in binary form as the second sub-instruction at memory address 01. The third and final sub-instruction represents the direction of change of the particular segment, a 0 bit indicating a positive change of direction and a 1 bit indicating a negative change of direction. Therefore, with respect to segment A-B of waveform 12, a 0 bit is stored as the third sub-instruction at memory address 01 indicating that the segment has a positive slope or change of direction. The remaining segments of the waveform 12 are similarly defined in consecutive memory addresses so that the entire waveform is represented by a sequential set of instructions stored in the waveform ROM 20.

Figure 5A:
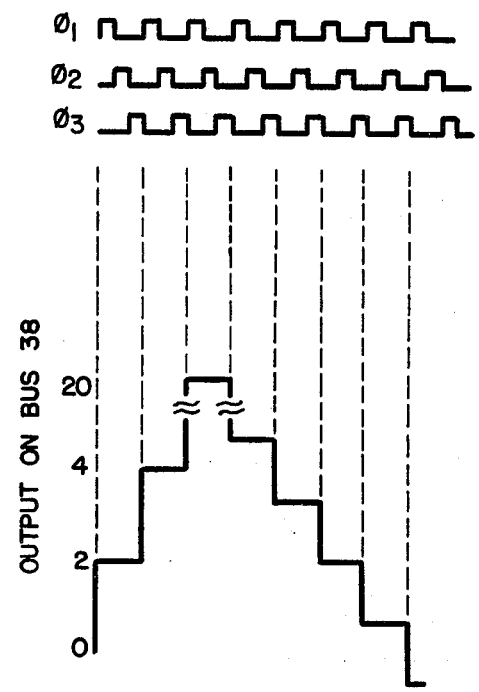
FIG. 5A graphically illustrates the output of the multiphase clock of FIG. 2 and its relationship to the stepped signal produced at the output of the latch of FIG. 2.
Figure 5B:
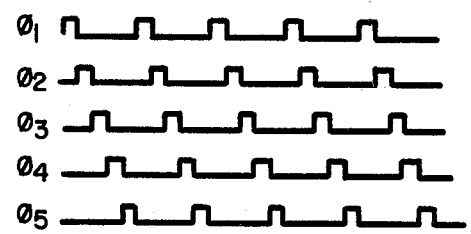
FIG. 5B graphically illustrates the output of the multiphase clock used in association with the circuit of FIG. 10.

Returning to FIG. 2, the output of the waveform ROM 20 representing the first sub-instruction, Number of Steps, is coupled by a bus 26 to one input of a coincidence circuit 28, the output of the coincidence circuit 28 being coupled by a line 30 to the clock input of the address counter 22. The $\phi_2$ phase of a multiphase clock 10, see FIG. 5B, the period of which defines the foregoing unit time interval, is coupled to the second input of the coincidence circuit 28. Coincidence circuit 28 may comprise, as shown in FIG. 4, a step counter 27 connected for counting the $\phi_2$ clock pulses and includes an output connected by a bus 29 to one phase input of a comparator 31. The comparator 31 has a second input connected for receiving the first sub-instruction data over bus 26 and a control output connected to line 30 for clocking the address counter 22 in response to detecting an equality condition between the data presented to its two inputs. Thus, the coincidence circuit 28 is effective for clocking the address of ROM 20 after a number of clock pulses equal to the value of the first sub-instruction have transpired.

The output of the waveform ROM 20 representing the second sub-instructions, step size, is coupled by a bus 32 to a first input of an adder-subtractor circuit 34 whose output is coupled to the data input of a latch 36. The latch 36 is clocked by the $\phi_1$ phase of the multiphase clock 10 and includes an output coupled by a bus 38 back to the second input of the adder-subtractor circuit 34 and also to the input of a digital-to-analog converter 40 at whose output is developed the tone signal defined by the contents of the waveform ROM 20. The mode of operation of the adder-subtractor 34 is determined by the third sub-instruction, the direction data, which is coupled to the adder-subtractor 34 over a line 42. A signal developed on line 42 representing a positive slope, i.e. a 0 bit, places the circuit 34 in its addition mode while a signal on line 42 representing a negative slope, i.e. a 1 bit, places the circuit 34 in its subtraction mode.

As will be explained in further detail hereinafter, the signal developed on ouput bus 38 may be represented by the waveform of FIG. 6. It will be observed that this waveform comprises a signal composed of a plurality of contiguous steps, each step having a constant width and a variable amplitude. Moreover, it will be observed that this waveform closely approximates the waveform 12 as shown in FIG. 1. The digital-to-analog converter 40 receives the signal represented by the waveform of FIG. 6 and converts it into a series of linear segments each approximating a respective segment of the waveform 12.

The operation of the tone generator of FIG. 2 will now be explained in more detail. To initialize operation of the circuit, the address counter 22 and the step counter 27 of coincidence circuit 28 are both initially reset to 0 while the latch 36 is preset for storing a binary code representing a 0 value. For example, in binary offset notation, the stored code would comprise 10000 . . . . After being reset, the address counter 22 is operative for initially addressing memory address 01 accessing the stored instruction representing waveform segment A-B. The output developed on bus 26, the first sub-instruction stored at memory address 01, therefore represents a value of ten while the output developed on bus 32, the second sub-instruction stored at memory 01, represents a value of two. The third sub-instruction stored at memory address 01 is coupled to line 42 as a 0 value signal placing the adder-subtractor circuit 34 in its addition mode and indicating that the segment stored a memory address 01 is to have a positive slope.

Since the adder-subtractor circuit 34 has been placed in its addition mode, it is operative for adding the current value represented by the signal on bus 32 to the value of the binary code initially stored in the latch 36. The output of the adder-subtractor circuit 34 therefore comprises a code representing the value two, which code is stored in the latch 36 in response to the first leading edge of clock phase $\phi_1$ (see FIG. 5A). In this regard, it will be recalled that one clock period represents one unit time interval fixing the width of one step of the stepped waveforms shown in FIGS. 5A and 6. Thus, in response to the first leading edge of clock phase $\phi_1$, the output code developed on bus 38 comprises a binary signal having a value of two, this binary signal being coupled to the digital-to-analog converter 40 as well as back to the second input of the adder-subtractor circuit 34. Since both inputs to the adder-subtractor circuit 34 now comprise binary signals having values of two, a binary signal having a value of four is coupled to the data input of the latch 36. This signal is stored in the latch 36 in response to the second leading edge of the clock signal $\phi_1$ and simultaneously coupled to the output bus 38. Now a signal representing the value four is coupled back to the second input of the adder-subtractor circuit 34 and added to the signal presented on bus 32 (having a value of two) whereby a binary signal having a value of 6 is coupled to the data input of the latch 36. As before, this signal is stored in the latch 36 in response to the next leading edge of clock phase $\phi_1$ and thereupon developed on output bus 38. The foregoing process is continuously repeated whereby a stepped signal increasing in amplitude in increments of two is produced between points A and B.

After the coincidence circuit 28 has counted ten leading edges of the $\phi_2$ phase of the clock signal, a coincidence signal is developed on line 30 clocking the address counter 22 for accessing the next memory address, memory address 02, of the waveform ROM 20. Memory address 02 contains the sub-instructions for approximating waveform segment B-C. Consequently, the output of the waveform ROM 20 developed on bus 26 represents the value of the first sub-instruction stored in memory address 02, the output developed on bus 32 represents the value of the second sub-instruction stored in memory address 02 and the output developed on line 42 represents the value of the third sub-instruction stored at the memory address 02. Since the third sub-instruction is represented by a 1 bit signal, the adder-subtractor circuit 34 is placed in its subtraction mode whereby the value of the signal developd on bus 32 is subtracted from the value of the signal developed on output bus 38 and coupled to the data input of the latch 36. Since the last signal stored in the latch 36 associated with the generation of waveform segment A-B has a value of twenty, the initial subtraction operation performed by the adder-subtractor circuit 34 results in a signal having a value of 18 being coupled to the data input of the latch 36. This signal is stored in the latch in response to the subsequently occurring leading edge of clock phase $\phi_1$ and thereupon developed on output bus 38. With reference to FIG. 6, the foregoing is represented by the first negative going step forming the segment B-C. Waveform segment B-C is completed by successively reperforming this subtraction operation such that a negative going stepped signal comprising ten steps of two increments each is generated.

Upon completion of the ten steps comprising segment B-C, the address counter 22 is again clocked by the coincidence circuit 28 for accessing the next memory address, memory address 03. Memory address 03 defines waveform segment C-D and results in the production of a positive going stepped signal on output bus 38 of latch 36 consisting of four steps of three unit increments. The remaining segments of the waveform 12 are similarly approximated as suitably stepped signals developed on bus 38 such that a stepped signal approximating waveform 12 is produced as shown in FIG. 6. The stepped signal produced on the output bus 38 is suitably smoothed by the analog-to-digital converter 40 which thereby generates a piecewise linear signal closely approximating the waveform 12.

FIG. 7 illustrates an embodiment of a circuit adapted for suitably presetting the tone source apparatus shown in FIG. 2. It will be recalled that prior to initiating the production of a musical tone waveform, the address counter 22 and the step counter 27 of coincidence circuit 28 are reset to 0 while the latch 36 is preset for storing a binary code representing a 0 value. The circuit of FIG. 7 is adapted for performing this function as well as for resetting the circuits of the tone source apparatus subsequent of reading the entire contents of the waveform ROM 20.

Referring in detail to FIG. 7, a power on reset (POR) circuit 43 is responsive to the instrument's power on-off switch 45 for developing an output pulse on a line 47 in response to applying power to the generator by closing the switch 45. The pulse so developed on line 47 is coupled to one input of an OR gate 44 and to the reset input of a flip-flop 50. The pulse coupled to the OR gate 44 is effective for setting an R-S flip-flop 46 causing its Q output to go logically high. The logically high Q output of the flip-flop 46 is, in turn, coupled to a line 48 for resetting the address counter 22 and the step counter 27 and for presetting the latch 36 for storing a binary code having a 0 value.

The tone generator is subsequently operated by taking the address counter 22 and the step counter 27 out of reset in response to the generation of a start pulse. The start pulse, which is generated in response to the operation of a key of the keyboard 49 of the tone generator, is coupled to the clock input of flip-flop 50. The logically high Q output of flip-flop 50 enables a D flip-flop 52 for coupling a $\phi_3$ phase clock pulse to its Q output and over a line 54 to the reset input of both flip-flops 50 and 46. The pulse developed on line 54 is therefore effective for taking the address counter 22 and the step counter 27 out of reset and also for removing the preset signal applied to the latch 36. Under these conditions, the circuit of FIG. 2 is properly conditioned for producing the stepped tone signal approximating the waveform 12 as previously described. The pulse developed on line 54 is also effective for resetting flip-flop 50 conditioning the start-up circuit of FIG. 7 for processing a subsequently supplied start pulse.

The start-up circuit of FIG. 7 further includes a comparator 56 having a first input connected to the output bus 24 of the address counter 22 and a second input supplying a code from, for example, a storage register, representing the final memory address in which waveform data is stored in the ROM 20. An equality pulse is developed on an output line 58 of the comparator 56 in response to the count characterizing bus 24 achieving the value of the final memory address. The equality pulse is coupled through a two-stage shift register consisting of two D flip-flops 60 and 62 and therefrom to the second input of the OR gate 44 for setting the flip-flop 46. Consequently, upon reading the entire content of the waveform ROM 20, the Q output of flip-flop 46 goes logically high for resetting the tone generator apparatus of FIG. 2 until another start pulse is generated so as to initiate the production of another waveform by cycling through the memory addresses of the waveform ROM 20.

Figures 8, 9:
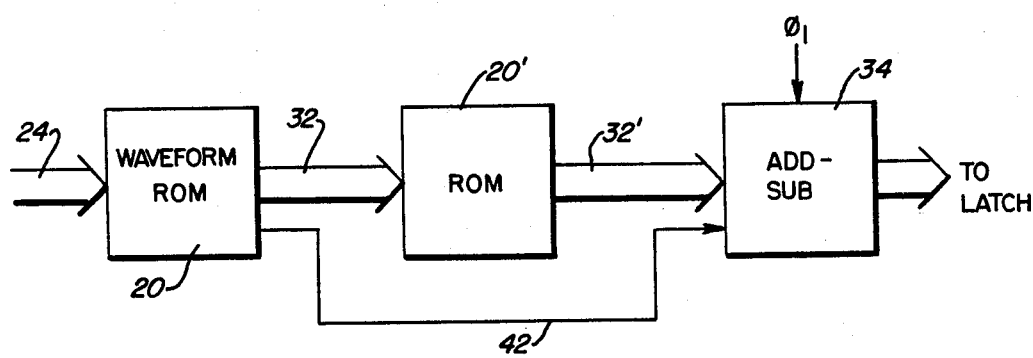
FIG. 8 is a modification of the tone generator of FIG. 2 adapted for effecting a memory capacity savings.
FIG. 9 is a table illustrating the method of programming ROMS 20 and 20′ shown in FIG. 8.

FIG. 8 illustrates a modification of the tone generator of FIG. 2 which facilitates a reduction in the necessary memory capacity of waveform ROM 20 although with some attendant loss of resolution. In FIG. 8, an additional ROM 20' is interposed between the waveform ROM 20 and the adder-subtractor circuit 34 and is programmed for supplying step size data to circuit 34 over bus 32' in response to input address signals from waveform ROM 20. In particular, the memory capacity of the waveform ROM 20 may be significantly reduced by storing a decreased word length address code in place of the step size data otherwise stored in ROM 20 and using the stored address codes to access increased word length step size data stored in ROM 20' for application to circuit 34.

The foregoing is illustrated in the table of FIG. 9. Assume initially that the tone generator of FIG. 2, not including the modification of FIG. 8, employs a waveform ROM 20 having 1,000 memory addresses each including an 8-bit step size code. In this case, 8,000 bits of memory are required to store the step size data assuming that the entire memory is exercised. Now, the memory saving features of the FIG. 8 modification may be implemented by replacing each 8-bit step size code stored in ROM 20 with a, for example, 6-bit address code thereby achieving a memory savings of 2,000 bits. Each thusly programmed 6-bit address code is effective for addressing a selected 8-bit step size signal stored in ROM 20'. In order to accommodate all possible address codes stored in ROM 20, ROM 20' is characterized by $2^6 = 64$ memory address locations each of which consists of an 8-bit step size code. As a result, the overall savings in memory capacity is $2,000 - 512 = 1,488$ bits.

Referring to the table of FIG. 9, it will be seen that the step size data stored in ROM 20' increases in non-linear steps as the memory addresses supplied on bus 32 increases. This is necessary in order to insure that the full range of step size codes, i.e. $0-2^8$, stored in ROM 20' may be exercised by the $2^6$ address codes stored in ROM 20. However, at the same time, a loss of some resolution is encountered for the larger step size codes. For example, it will be noted that step sizes ranging from 00000000 to 00000100 (4) may be uniquely addressed by the first four memory address codes stored in ROM 20. This is not true, however, for larger step size codes. Thus, while step size codes of 00000110 (6) and 00001000 (8) may be accessed, an intermediate step size code having a value of 7 is not available. A step size having a value of 7 would, therefore, be programmed as either the step size code 00000110 (6) or 00001000 (8) thereby resulting in a slight loss of resolution.

Figure 11:
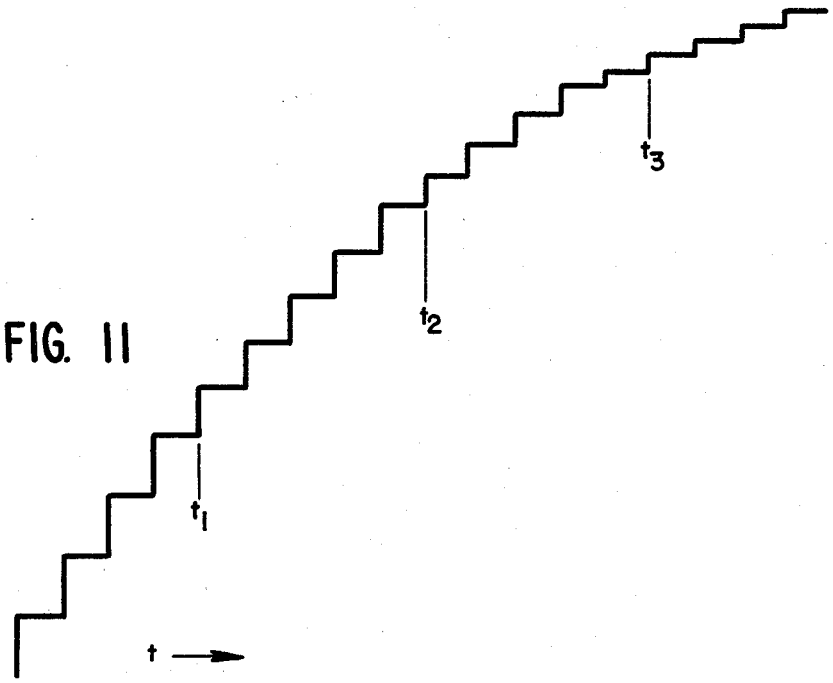
FIG. 11 shows a convexly curved stepped waveform segment illustrating the operation of the circuit of FIG. 10.
Figure 10:
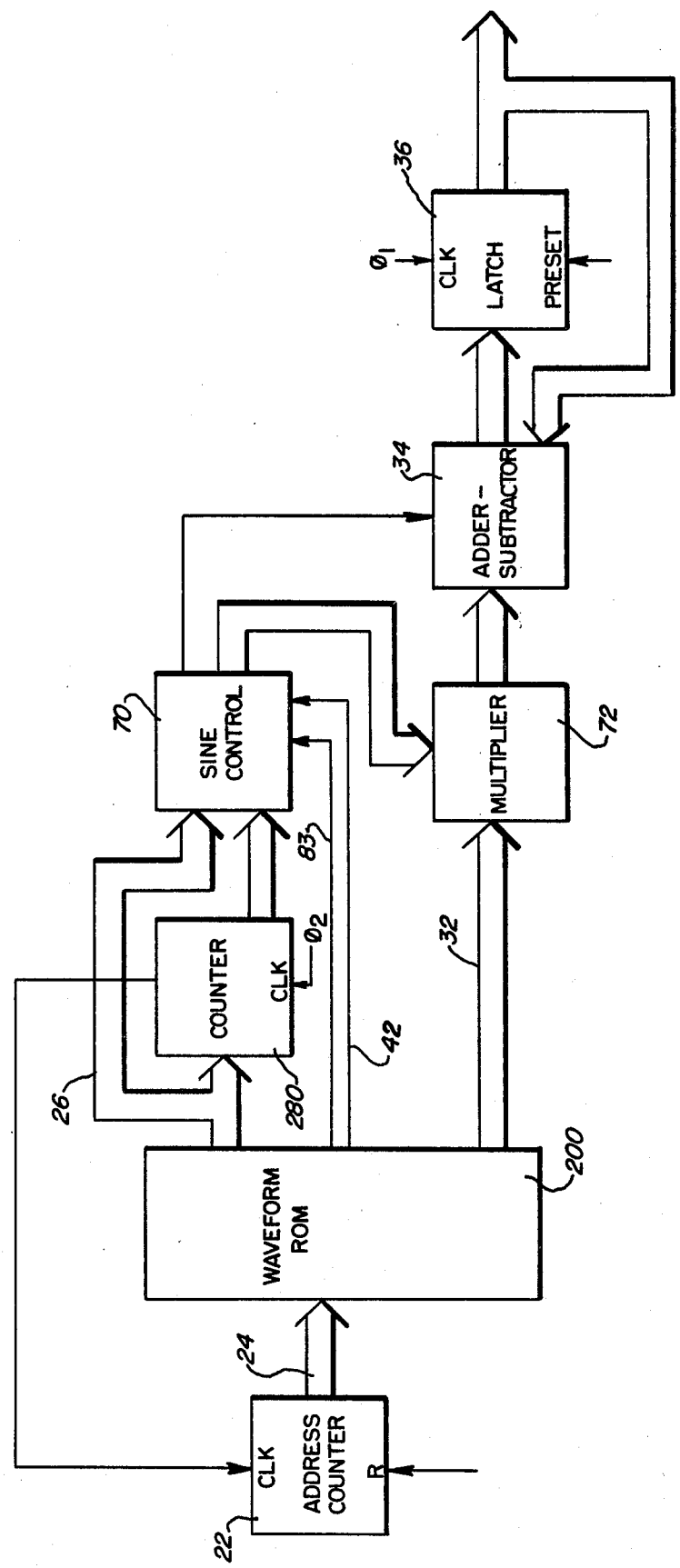
FIG. 10 is a general block diagram of a modification of the tone generator of FIG. 2 capable of producing sinusoidal waveform segments.

When generating tone signals representing curved waveforms with linear piecewise tone generator apparatus of FIG. 2, it is necessary to break the waveform into a plurality of straight line segments each of which approximates a portion of the curved waveform. A more efficient technique, however, for generating curved waveforms is to piece together segments having sinusoidal forms rather than linear segments. The circuit illustrated in FIG. 10 is operative for generating tone signals approximating a curved waveform by suitably piecing together such sinusoidal segments. The theory of operation of the circuit of FIG. 10 is exemplified by the stepped waveform shown in FIG. 11. It will be seen that the stepped signal shown in FIG. 11 is characterized by a plurality of steps each having the same time duration as measured along the time axes. However, the step size or step amplitude is progressively decreased from a maximum value of four units to a minimum value of one unit, the step amplitude changes occurring at times $t_1$, $t_2$ and $t_3$. It will be observed that the effect of so decreasing the step size or step amplitude while holding the step time duration constant is that of synthesizing or generating a convexly curved waveform segment. The precise shape and curvature of the segment may be controlled by suitably selecting the times $t_1$, $t_2$ and $t_3$ at which the step amplitude changes occur as well as by suitably selecting the magnitudes of the amplitude changes. Also, a waveform segment having a concave curvature can be produced by gradually increasing the step amplitude with time instead of decreasing the step amplitude as illustrated in FIG. 11.

The circuit of FIG. 10 is a modification of the tone generator apparatus of FIG. 2 which is adapted for producing quarter cycle sinusoidal waveform segments in accordance with the techniques explained above with reference to FIG. 11. Briefly, in the circuit of FIG. 10, a sine control circuit 70 is provided for controlling the operation of a multiplier circuit 72 interposed between the bus 32 and the adder-subtractor circuit 34 of FIG. 2. The multiplier circuit 72, in response to the sine control circuit 70, effectively modifies the step amplitude signals developed on bus 32 so that sinusoidally shaped stepped signals are developed on the output 38 of the latch 36 and converted to corresponding tone signals at the output of the analog-to-digital converter 40. A key feature of this circuit is its ability to form sinusoidally shaped quarter cycle segments without requiring the use of a sine look-up table which typically requires a large amount of memory capacity.

Figure 12:
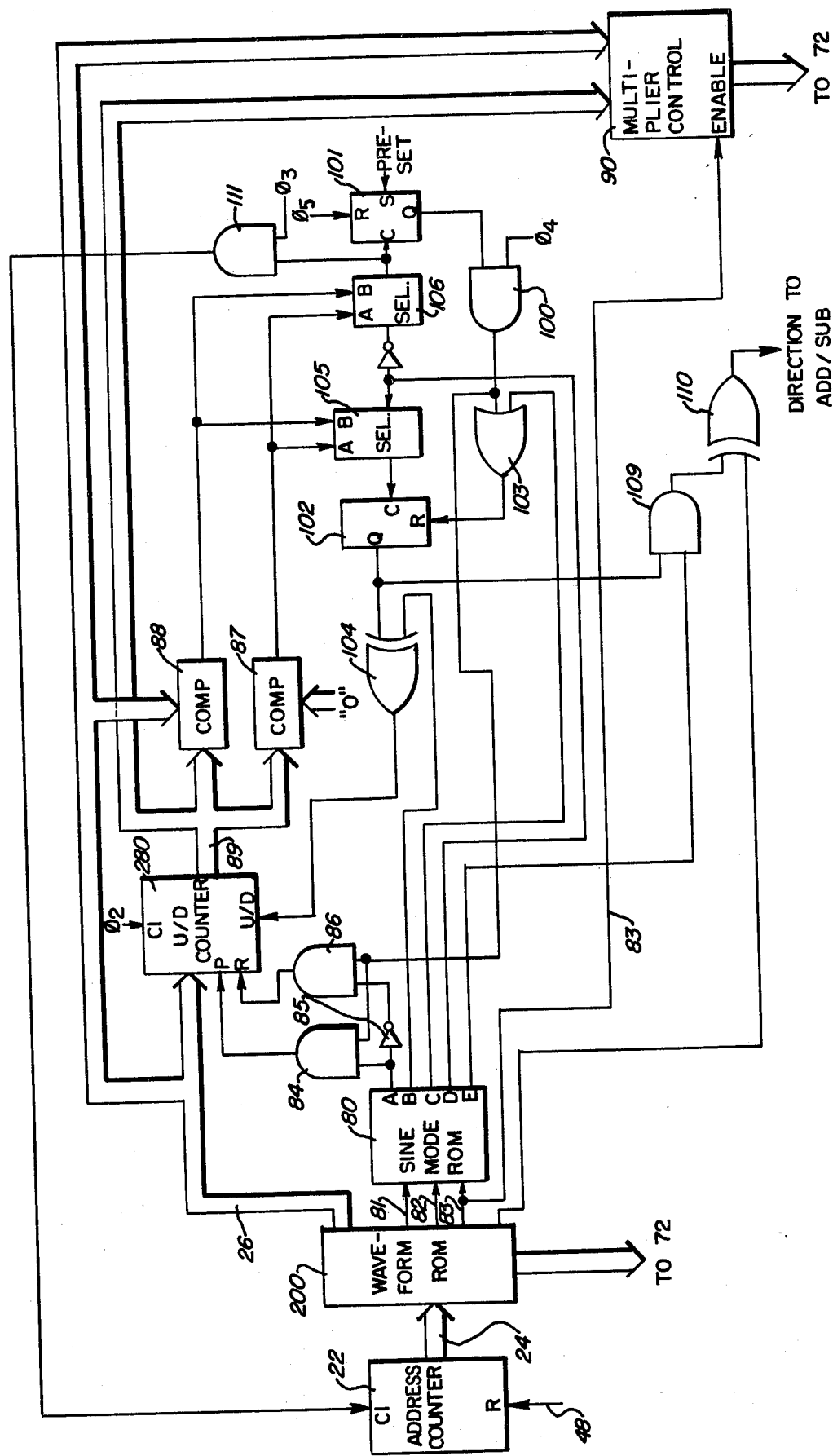
FIG. 12 is a partial logic diagram and partial block diagram illustrating certain portions of the circuit of FIG. 10.

FIG. 12 illustrates an embodiment of the sine control circuit 70 which is adapted for operating the multiplier 72 for suitably modifying the step amplitude data developed on bus 32 so as to selectively enable the production of concave and convex quarter cycle sinusoidal waveform segments as in FIG. 11 and further includes means for modifying the data on bus 32 for enabling the production of half cycle sinusoidal segments as well as "S-curve" sinusoidal segments. The circuit is also operative in a mode for producing linear waveform segments as previously described.

Figures 13, 14, 15:
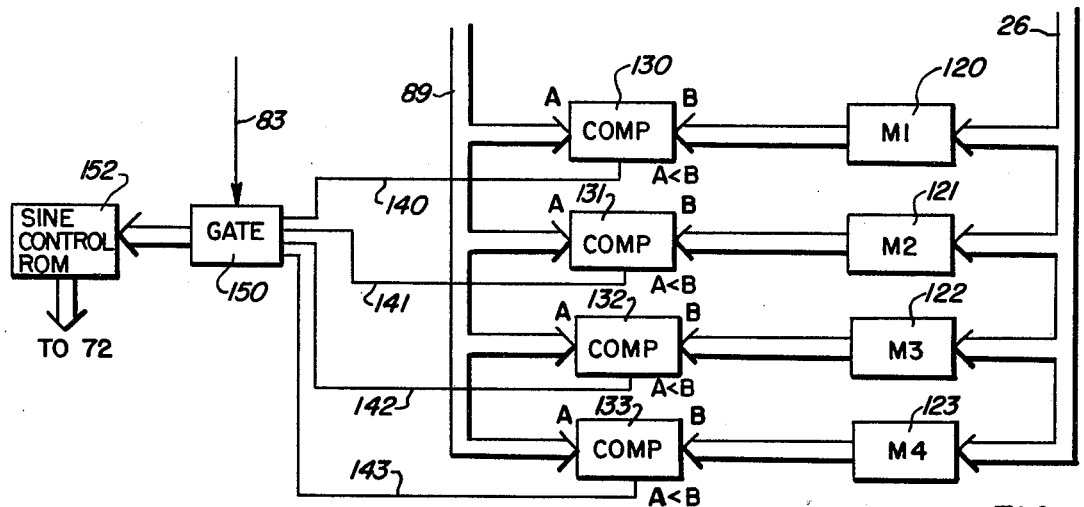
FIG. 13 is a table illustrating the method of programming ROM 80 of FIG. 12.
FIG. 14 is a block diagram showing the construction of the multiplier control block 90 of FIG. 12.
FIG. 15 is a table illustrating the method of programming the ROM 152 of FIG. 14.

The sine control circuit 70 illustrated in FIG. 12 includes a sine mode ROM 80 programmed as shown in FIG. 13. Referring to FIG. 3, it will be seen that the sine mode ROM 80 is characterized by five memory addresses each identifying a respective mode of operation of the sine control circuit 70. The memory addresses are accessed by three lines 81, 82 and 83 which are derived from three data bits stored in association with each waveform segment in the waveform ROM 20. The most significant bits of each memory address is also coupled from line 83 to the enable input of a multiplier control circuit 90. The contents of each memory address of the sine mode ROM 80 comprise five data bits each of which are coupled to a respective output A-E of the sine mode ROM 80 when the respective memory address is accessed. For example, accessing the memory address 100, i.e. selecting the convex quarter cycle sinusoidal mode of operation, results in the outputs A-E of the sine mode ROM 80 being characterized by the data bits 00100 respectively.

Considering the quarter cycle convex sinusoidal mode of operation first, the memory address 100 is coupled from the waveform ROM 20 to the sine mode ROM 80 via lines 81, 82 and 83 as discussed above. This results in the outputs A-E of the sine mode ROM taking on the values 00100 respectively. The 0 value A output of the sine mode ROM 80 inhibits an AND gate 84 connected to the preset enable input of up-down counter 280 and, through an inverter 85, enables an AND gate 86 connected to the reset input of the counter 280. A flip-flop 101, which has previously been preset to its Q=1 state, is effective for enabling an AND gate 100 which couples a $\phi_4$ phase clock pulse (see FIG. 5B) via the enabled AND gate 86 for resetting the up-down counter 280. The flip-flop 101 is subsequently reset by the next occurring $\phi_5$ phase clock pulse thereby inhibiting AND gate 100 from further resetting the counter 280 during the production of the current waveform segment.

The logical 1 signal developed on the C output of the sine mode ROM 80 is coupled to one input of an OR gate 103 which holds flip-flop 102 in its reset condition so that a logical 0 signal is coupled to a first input of an exclusive OR gate 104. The second input to the exclusive OR gate 104 is derived from the B output of the sine mode ROM 80 which, in the present mode of operation, consists of a logical 0 signal. Since both inputs to the exclusive OR gate are logical 0, its output, which is coupled to the up/down count control input of the counter 280, is also logical 0 placing the counter in its up-count mode of operation. Thus, the counter 280 has been reset and also placed in its up-count mode of operation. The D output of the sine mode ROM 80 is coupled to the control input of a first selector circuit 105 and through an inverter to the control input of a second selector circuit 106. Both of the selector circuits 105 and 106 are operative for coupling data from the respective selector circuit's A input to its output in response to the presentation of a 0 value logic signal to the control input and from its B input to its output in response to the presentation of a logical 1 value signal to its control input. Thus, the logical 0 value D output of the sine mode ROM 80 causes selector circuit 105 to couple data from its A input to its output and causes selector circuit 106 to couple data from its B input to its output. The A inputs of selector circuits 105 and 106 are connected to the output of a first comparator 87 while the B inputs of the selector circuits are supplied from the output of a second comparator 88. Comparator 87 is connected for supplying an output equality pulse in response to the output count developed by the counter 280 achieving a 0 value while the comparator 88 is connected for developing an output equality pulse in response to the output count developed by the counter 280 achieving a value equal to the first sub-instruction stored in the waveform ROM 20.

The E output of the sine mode ROM 80 is coupled to one input of an AND gate 109, the gate's other input being supplied from the Q output of flip-lop 102. The output of the AND gate 109 is connected to a first input of an exclusive OR gate 110 whose second input is supplied with the direction bit output of the waveform ROM 20. Since the E output of the sine mode ROM 80 is logic 0, AND gate 109 is inhibited and couples a logical 0 signal to the first input of the exclusive OR gate 110. The exclusive OR gate 110 consequently couples the direction bit from the waveform ROM 20 to the adder-subtractor circuit 34 without modification.

In operation, the counter 280, which has been reset and placed in its up-count mode as previously described, begins counting in an upward direction in response to $\phi_2$ clock pulses. The progressively increasing output count is coupled by a bus 89 to one input of the multiplier control circuit 90 which also receives data from the bus 26 representing the number of steps characterizing the waveform segment. The multiplier control circuit 90, which is enabled by the logical 1 signal developed on line 83, couples selected multiplication factors at selected times to the multiplier circuit 72 for suitably modifying the step amplitude data on bus 32 so as to enable the production of a stepped signal at the output of the latch 36 approximating a convex quarter cycle sinusoidal waveform segment. Upon completing the production of the quarter cycle sinusoidal segment, an equality pulse is coupled from the output of the comparator 88 through the selector circuit 106 clocking the flip-flop 101 to its Q=1 state and also enabling an AND gate 111. Flip-flop 101 is consequently effective for again enabling AND gate 100 for initiating production of the next waveform segment while AND gate 111 is conditioned for coupling a $\phi_3$ phase clock pulse for incrementing the address counter 22 which thereby accesses the instruction defining the next waveform segment.

A quarter cycle concave sinusoidal waveform segment is produced by accessing memory address 101 of the sine mode ROM 80 over lines 81-83. In this mode of operation, the A-E outputs of the sine mode ROM are 11110 respectively. The basic difference between the concave and convex modes of operation is that in the convex mode the counter 280 is operated as an up counter counting from 0 to the number stored as the first sub-instruction of the waveform ROM 20 while, in the concave mode, the counter is operated as a down counter counting from the code stored as the first sub-instruction to a 0 value.

More particularly, in the concave mode of operation a logical 1 signal is coupled from the A output of the sine mode ROM 80 for inhibiting AND gate 86 and enabling AND gate 84. A $\phi_4$ phase clock pulse is consequently coupled through AND gate 100 and AND gate 84 to the preset enable input of the counter 280. The counter is thereby preset to the value represented by the first sub-instruction developed on bus 26. The flip-flop 102 is maintained in its reset condition by the logic 1 signal coupled from the C output of the sine mode ROM 80 through OR gage 103 to the flip-flop's reset terminal. However, since the B output of the sine mode ROM 80 is now logical 1, the output of the exclusive OR gage 104 is also logical 1 placing the counter 280 in its down-count mode of operation. Also, since the D output of the sine ROM 80 is now logical 1, selector circuit 105 is operative for sampling its B input while selector circuit 106 is operative for sampling its A input. Gates 109 and 110 are conditioned as previously described with regard to the convex mode of operation.

The counter 280 now begins counting down in response to $\phi_2$ phase clock pulses from the preset value represented by the first sub-instruction towards a 0 value. The multiplier control circuit 90, as will be described in further detail hereinafter, produces suitable multiplication factors as the counter progressively counts down for modifying the step amplitude data on bus 32 so as to enable the production of a concave quarter cycle sinusoidal segment at the output of latch 36. Upon completing the quarter cycle segment, i.e. when the counter 280 is characterized by a 0 count, an equality pulse is developed at the output of comparator 87 and coupled by the selector circuit 106 for clocking flip-flop 101 and enabling AND gate 111. Flip-flop 101 is therefore again placed in its Q=1 state in anticipation of the next instruction while AND gate 111 couples a $\phi_3$ phase clock pulse for incrementing the address counter 22 which accesses the next succeeding waveform ROM memory address containing the next waveform segment instruction.

The circuit of FIG. 12 is also operative for producing half-wave sinusoidal segments. This mode of operation is identified by sine mode ROM memory address 110 and results in the outputs A-E of the sine mode ROM 80 being characterized by the logic values 00011, respectively. The logic 0 signal at the A output of the sine mode ROM 80 inhibits AND gate 84 and enables AND gate 86 for receiving a $\phi_4$ phase clock pulse for resetting the counter 280. The $\phi_4$ clock pulse is also coupled through OR gate 103, which now receives a 0 value logic signal at its second input from the C output of the sine mode ROM 80, for resetting the flip-flop 102 whose Q output therefore goes logically low. Since both inputs of the exclusive OR gate 104 are logically low, the gate's output is also logically low placing the counter 280 in its up-count mode. Also, due to the logical 1 signal at the D output of the sine mode ROM 80, selector circuit 105 is operated for sampling its B input while the selector circuit 106 is operated for sampling its A input. The counter 280 is consequently initially operated for counting up from 0 toward the value stored at the first sub-instruction of the accessed waveform ROM memory address. As this count progresses, the multiplier control circuit 90 suitably controls the muliplier circuit 72 for producing a convex quarter cycle sinusoidal waveform segment. During the production of this segment, the output of AND gate 109 is logically low so that the direction bit from the ROM 20 is coupled in unmodified form by the exclusive OR gate 110 to the adder-subtractor circuit 34.

Now, once the counter 280 achieves the value stored at the first sub-instruction of the accessed waveform ROM memory address, at which time the generation of an initial quarter cycle sinusoidal segment will have been completed, an equality pulse is developed at the output of comparator 88. This equality pulse is coupled by selector circuit 105 for clocking flip-flop 102 but has no effect on selector circuit 106 which is sampling its A input. The Q output of flip-flop 102 therefore goes logically high coupling a logical 1 signal through exclusive OR gate 104 to the mode control input of the counter 280. The counter is therefore placed in its down-count mode. Also, the logical 1 Q output of flip-flop 102 is coupled to AND gate 109 which operates exclusive OR gate 110 for inverting the polarity of the direction bit coupled to the adder-subtractor circuit 34. The counter 280 is now operated in its count-down mode for counting from the value represented by the first sub-instruction to 0. As a result, a concave quarter cycle segment is produced as described above with regard to the quarter cycle mode of operation of circuit 70 and, together with the previously generated quarter cycle convex segment constitutes a continuous half cycle segment. In response to the output of the counter 280 achieving a 0 count, an equality pulse is developed at the output of comparator 87, which is coupled by the selector circuit 106 for clocking flip-flop 101 to its Q=1 state and enabling AND gate 111. AND gate 111 thereby couples a $\phi_3$ phase clock pulse for incrementing the address counter 22 for accessing the next memory address of the waveform ROM 20.

The sine control circuit 70 is operable in yet another mode for enabling the production of a so-called "S-curve" sinusoidal waveform segment. An "S-curve" sinusoidal segment of this type comprises an initial concave quarter cycle sinusoidal segment followed by an increasing convex quarter cycle sinusoidal segment. In order to realize this waveform segment, the counter 280 is initially operated in its down-count mode for producing the initial quarter cycle concave sinusoidal segment and then in its up-count mode for generating the convex quarter cycle sinusoidal segment. However, since the slope of the entire curve remains positive the polarity of the direction bit is not inverted at the 90° point in the waveform as was done in the case of the pure half cycle sinusoidal segment.

In more detail, it will be seen that accessing memory address 111 of the sine mode ROM 80, the "S-curve" mode of operation, results in outputs A-E being characterized by the logic signals 11000 respectively. The 1 level logic signal at the A output of the sine mode ROM 80 enables AND gate 84 for presetting the counter 280 to a value corresponding to the first sub-instruction of the accessed waveform ROM memory address in response to a $\phi_4$ phase clock pulse coupled through previously enabled AND gate 100. The $\phi_4$ phase clock pulse coupled through AND gate 100 is also effective for resetting flip-flop 102 through OR gate 103 so that a logical 0 signal is developed at the Q output of the flip-flop 102. The logical 0 signal at the Q output of flip-flop 102, together with the logical 1 signal at the B output of the sine mode ROM 80, results in a logical 1 signal being coupled by the exclusive OR gate 104 to the mode control input of counter 280 placing the counter in its down-count mode of operation. The 0 value logic signal developed at the C output of the sine mode ROM 80 causes selector circuit 105 to sample its A input and selector 106 to sample its B input. Also, AND gate 109 is inhibited in response to the logical 0 signal at the E output of the sine mode ROM for preventing inversion of the direction bit developed on line 42.

The counter 280 consequently begins counting down from the value represnted by the first sub-instruction in response to 100 $_2$ phase clock pulses for generating the initial concave quarter cycle segment. In response to the output of the counter reaching a 0 count, an equality pulse is developed at the output of comparator 87, which pulse is coupled by the selector circuit 105 for clocking flip-flop 102 to its Q=1 state. It will be observed that the equality pulse developed at the output of comparator 87 has no effect on the selector circuit 106. The logical 1 signal now developed at the Q output of flip-flop 102 causes the output of exclusive OR gate 104 to go logically low thereby placing the counter 280 in its up-count mode. The counter therefore begins counting $\phi_2$ phase clock pulses in an upwardly direction until achieving a count corresponding to the first sub-instruction whereby the convex quarter cycle segment of the "S-curve" is generated. Upon achieving a count corresponding to the stored first sub-instruction, which occurs upon the completion of the "S-curve", an equality pulse is developed at the output of comparator 88, which pulse is coupled to the B input of selector circuit 106. As in the previous modes of operation, selector circuit 106 couples the equality pulse for clocking flip-flop 101 to its Q=1 state in anticipation of the next instruction and for enabling AND gate 111. Enabled AND gate 111 couples a $\phi_3$ clock pulse for incrementing the address counter for accessing the next memory address in the waveform ROM 20.

An embodiment of the multiplier control circuit 90 shown generally in FIG. 12 is illustrated in FIG. 14. The circuit includes a plurality of multiplication circuits 120-123 each operative for multiplying the value of the addressed first sub-instruction of the waveform ROM 20 developed on bus 26 by a different multiplication factor M1, M2, M3 and M4 respectively. The multiplication factors M1-M4 decrease progressively in magnitude with the values 0.8125, 0.750, 0.5625, and 0.3125 respectively being employed in an embodiment of the circuit actually reduced to practice. The outputs of each of the multipliers 120-123 are respectively coupled to the B inputs of a plurality of comparators 130-133. Each of the comparators 130-133 receives at its A input the output count developed on bus 89 of the counter 280. Each comparator 130-133 further includes an output control line 140-143 respectively which goes logically high only when the data presented to the A input of its respective comparator is less than the value presented to the comparator's B input. The control output lines 140-143 are coupled through a gate 150, which is enabled in response to a signal on line 83, to a sine control ROM 152. The output of the sine control ROM is then coupled to the multiplier circuit 72.

The sine control ROM 152 is programmed as shown in FIG. 15. It will be seen that the sine control ROM 152 couples a multiplier having a value of 1.000 to the multiplier circuit 72 in response to the control output lines 140-143 all being logically high. This represents the condition wherein the output of the counter 280 is less than the outputs of all of the multiplier circuits 120-123. As the output of the counter 280 increases, control line 143 initially goes low resulting in a multiplier having a value of 0.750 being coupled to the multiplier circuit 72. As the counter continues to increase its output count, multipliers having values of 0.500, 0.250 and 0.125 are consecutively coupled from the sine control ROM 152 to the multiplier circuit 72. If the counter 280 is operating in its down-count mode of operation, the initial mulitplier value coupled to the multiplier circuit 72 by the sine control ROM 152 will have a value of 0.125. As the output count decreases multipliers having values of 0.250, 0.500, 0.750 and 1.000 are successively coupled to the multiplier circuit 72. It will be appreciated that the time points at which the multiplier values coupled by the sine control ROM 152 change are controlled by the multiplication factors characterizing multipliers 120-123. The presence of a 0 value logic signal on conductor 83, indicating the linear mode of operation, results in the gate 150 being inhibited so that its output is continuously 1111 for accessing the multiplier value 1.000. The multiplier circuit 72 thereby has no effect on the step amplitude data supplied by the waveform ROM 20 so that a piecewise linear waveform segment is produced.

Figure 16:
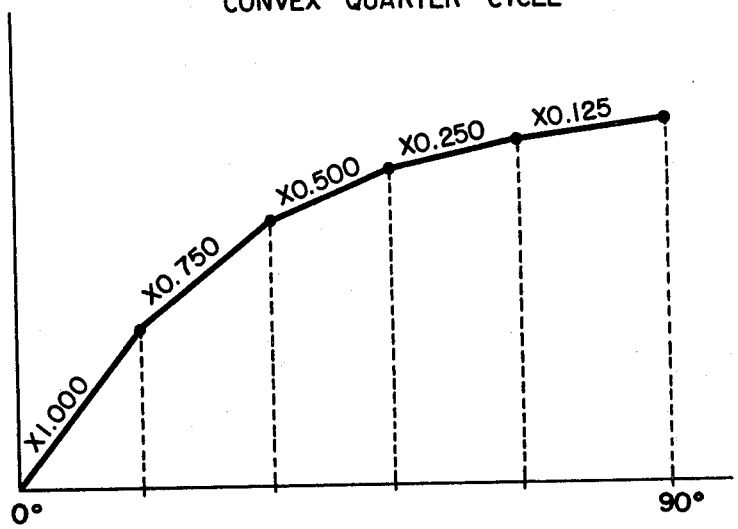
Figure 17:
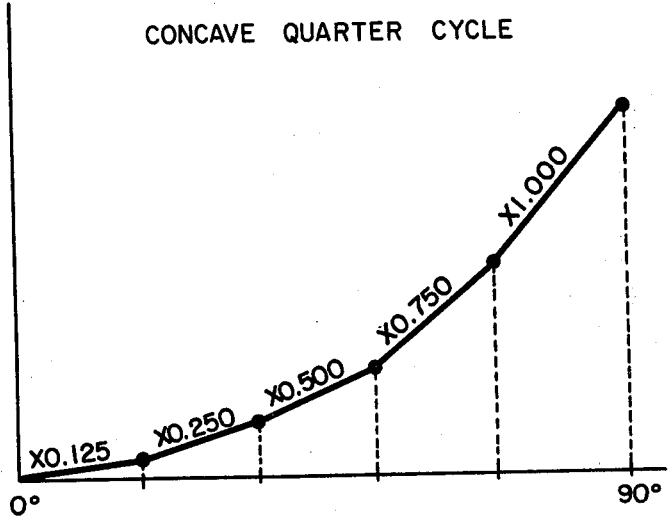

In accordance with the foregoing, in the convex quarter cycle mode of operation of sine control circuit 70, wherein the counter 280 counts up from 0 to the value of the first sub-instruction stored at the accessed memory address of the waveform ROM 80, the step amplitude data developed on bus 32 is multiplied by multiplication factors progressively decreasing from 1.000 to 0.125. This effect is illustrated in FIG. 16 which represents a convex quarter cycle sinusoidal segment generated by the tone apparatus of the invention. FIG. 17 shows a quarter cycle concave sinusoidal segment produced by the tone generator apparatus. In this case, since the counter 280 is operating in its count down mode, the step amplitude data on bus 32 is pregressively multiplied by multiplication factors having values starting at 0.125 and progressively increasing to 1.000.

FIGS. 18 and 19 show corresponding representations of the waveform segments produced when the sine control circuit 70 is operated in its half cycle sinusoidal mode and in its "S-curve" mode. In the half cycle mode illustrated in FIG. 18, the counter 280 is initially operated in its up-count mode so that the step amplitude data on bus 32 is multiplied by factors having values starting at 1.000 and progressively decreasing to 0.125 at the 90° point. Between 90° and 180° the counter is operated in its down-count mode so that the amplitude data on bus 32 is multiplied by factors having values starting at 0.125 and progressively increasing to 1.000. It will be noted that the adder-subtractor circuit 34 is operated in its addition mode during the first quarter cycle segment and in its subtraction mode during the second quarter cycle segment.

In the "S-curve" mode shown in FIG. 19, the counter 280 is initially operated in its count down mode so that the amplitude data on bus 32 is multiplied by factors having values starting at 0.125 and progressively increasing to 1.000 at the 90° point. Between 90° and 180° the counter is operated in its count up mode so that the amplitude data on bus 32 is multiplied by factors having values starting at 1.000 and progressively decreasing to 0.125, the adder-subtractor circuit 34 being operated in its addition mode during both quarter cycle segments.

It will thus be seen that, through the use of the tone generator apparatus of the invention, a musical tone waveform may be approximated by a continuous series of waveform segments, each of the waveform segments selectively comprising either a linear segment, a quarter cycle sinusoidal segment, convex or convave, a half-cycle sinusoidal segment or an "S-curve" segment. In this regard, it will be appreciated that the step amplitude data stored as the second sub-instruction in the waveform ROM 20 at a memory address representing a sinusoidal waveform segment will necessarily be different from the value which would be stored if the segment was to be approximated in a linear fashion. That is, since the stored step aplitude data associated with a sinusoidal waveform segment is multiplied by a series of factors having values less than one, the data must have a value greater than the corresponding data which would be used to approximate the segment linearly in order to insure that the sinusoidal segment extends completely to its intended terminus. For example, consider approximating a waveform segment having a total amplitude variation between its beginning and terminal points of twenty units and a time base of ten units. Using the linear approximation, the waveform ROM would be programmed for storing ten steps at the first sub-instruction and a step amplitude of two at the second sub-instruction whereby a signal having ten steps of two increments each would be generated between the beginning and terminal points. If, however, the same value second sub-instruction were used to generate one of the sinusoidal segments, the resulting stepped signal would not achieve the intended terminal point since, as previously described, the step amplitude data is progressively multiplied by factors having values less than one prior to being supplied to the adder-subtractor circuit 34. Therefore, to compensate for this effect, the step amplitude data stored at the second sub-instruction must be increased in a sinusoidal mode of operation to insure that the resulting waveform segment extends to the intended terminal point.

Having now fully described the invention, it will be apparent to one of ordinary skill in the art that many changes and modifications can be made thereto without departing from the spirit or scope of the invention as set forth herein.

What is claimed is:

1. A tone source apparatus for an electronic musical instrument comprising:
   a source of clock pulses having a period defining a unit time interval;
   memory means having a plurality of sequential addresses each storing an instruction defining a segment of a waveform, each of said instructions comprising at least first, second and third sub-instructions comprising, respectively, a code representing the time duration measured in terms of a number of said unit time intervals, a code representing a value corresponding to at least the amplitude variation per said unit time interval and a code representing the direction of slope of the associated waveform segment;
   an address counter clockable for accessing said memory addresses in sequence;
   coincidence means for clocking said address counter in response to the occurrence of a number of said unit time intervals equal to the value of said first sub-instruction of the currently accessed memory address;
   counting means responsive to said clock pulses and to said second and third sub-instructions for reversibly counting up or down in accordance with said third sub-instruction in increments according to said second sub-instruction; and
   control means interposed between said memory means and said counting means for selectively modifying said second sub-instruction for changing the counting increments of said counting means;
   whereby the output of said counting means comprises a series of signal segments as defined by said memory means and said control means.

2. The tone source apparatus according to claim 1 wherein said memory means comprises a first memory having a plurality of sequential addresses each storing one of said first and third sub-instructions and a selected address code representative of the associated second sub-instruction and a second memory storing a plurality of said second sub-instructions, said stored second sub-instructions being addressable by said stored address codes for accessing a desired second sub-instruction.

3. The tone source apparatus according to claim 2 wherein said stored sub-instructions are characterized by bit word lengths greater than said stored address codes.

4. The tone source apparatus according to claim 1 wherein said counting means comprises:
   latch means clocked in response to said clock pulses and having a data input and a data output; and
   adder-subtractor means operative for developing an output signal representing the sum of or difference between said second sub-instruction and said latch means data output in accordance with said third sub-instruction, said output signal being coupled to said latch means data input, whereby said latch means data output comprises the output of said counting means.

5. The tone source apparatus according to claim 1 including digital to analog converter means for converting the output of said counting means to a corresponding analog signal.

6. The tone source apparatus according to claim 1 wherein said control means comprises multiplier means connected for multiplying said second sub-instruction by a predetermined function changing with time for imparting a corresponding inflection to the output of said counting means.

7. The tone source apparatus according to claim 6 wherein said multiplier means comprises multiplier control means responsive to said first sub-instruction and to said sources of clock pulses for producing a binary output signal having values which change in magnitude by selected amounts and at selected percentages of the total time duration of a respective waveform segment, a multiplier circuit for developing the product of said binary output signal and said second sub-instruction and means coupling said product for operating said counting means.

8. The tone source apparatus according to claim 7 wherein said multiplier control means comprises:
means operable for counting up or down between a zero value count and a count corresponding to said dirst sub-instruction in response to said source of clock pulses;
means for operating said up-down counting means in a selected manner; and
means responsive to the output of said up-down counting means and to said first sub-instruction for producing said binary output signal.

9. The tone surface apparatus according to claim 8 wherein said means for producing said binary output signal comprises:
means for multiplying said first sub-instruction by a plurality of different progressively increasing factors each having a value less than unity for producing a corresponding plurality of time base control products;
means for comparing each of said time base control products to the output of said up-down counting means for developing a control signal indicative of the relationship between the output of said up-down counting means and each of said time base control products; and
means responsive to said means for comparing for producing said binary output signal such that the value thereof varies in dependence on the relationship between the output of said up-down counting means and said time base control products.

10. The tone source apparatus according to claim 9 wherein said factors characterizing said means for multiplying and said values characterizing said binary output signal are selected for imparting an approximately sinusoidal inflection to the output of said counting means.

11. The tone source apparatus according to claim 10 wherein said means for operating said up-down counting means comprises means operable for operating said up-down counting means for enabling said binary output signal for modifying said second sub-instruction for causing the output of said counting means to selectively assume approximate quarter cycle concave, quarter cycle convex, half-cycle and "S-curve" sinusoidal inflections.

12. A tone source apparatus for an electronic musical instrument comprising:
a source of clock pulses having a period defining a unit time interval;
memory means having a plurality of sequential addresses each storing an instruction defining a segment of a waveform, each of said instructions comprising at least first, second and third sub-instructions comprising respectively, a code representing the time duration measured in terms of a number of said unit time intervals, a code representing a value corresponding to at least the amplitude variation per said unit time interval and a code representing the direction of slope of the associated waveform segment;
an address counter clockable for accessing said memory addresses in sequence;
coincidence means for clocking said address counter in response to the occurrence of a number of said unit time intervals equal to the value of said first sub-instruction of the currently accessed memory address;
latch means clocked in response to said clock pulses and having a data input and a data output; and
adder-subtractor means operative for developing an output signal representing the sum of or difference between said second sub-instruction and said latch means data output in accordance with said third sub-instruction, said output signal being coupled to said latch means data input;
whereby said latch means data output comprises a series of signal segments as defined by the contents of said memory.

13. The tone source apparatus according to claim 12 wherein said memory means comprises a first memory having a plurality of sequential addresses each storing one of said first and third sub-instructions and a selected address code representative of the associated second sub-instruction and a second memory storing a plurality of said second sub-instructions, said stored second sub-instructions being addressable by said stored address codes for accessing a desired second sub-instruction.

14. The tone source apparatus according to claim 13 wherein said stored sub-instructions are characterized by bit word lengths greater than said stored address codes.

15. The tone source apparatus according to claim 12 including control means interposed between said memory and said adder-subtractor means for selectively changing the value of said sub-instruction for causing the data output of said latch means to be characterized by a desired inflection.

16. The tone source apparatus according to claim 15 wherein said control means comprises multiplier means connected for multiplying said second sub-instruction by a predetermined function changing with time for imparting a corresponding inflection to the data output of said latch means.

17. The tone source apparatus according to claim 16 wherein said multiplier means comprises multiplier control means responsive to said first sub-instruction and to said sources of clock pulses for producing a binary output signal having values which change in magnitude by selected amounts and at selected percentages of the total time duration of a respective waveform segment, a multiplier circuit for developing the product of said binary output signal and coupling said product to said adder-subtractor means in lieu of said second sub-instruction.

18. The tone source apparatus according to claim 17 wherein said multiplier control means comprises:
means operable for counting up or down between a zero value count and a count corresponding to said first sub-instruction in response to said source of clock pulses;
means for operating said up-down counting means in a selected manner; and
means responsive to the output of said up-down counting means and to said first sub-instruction for producing said binary output signal.

19. The tone source apparatus according to claim 18 wherein said means for producing said binary output signal comprises:
means for multiplying said first sub-instruction by a plurality of different progressively increasing factors each having a value less than unity for producing a corresponding plurality of time base control products;

means for comparing each of said time base control products to the output of said up-down counting means for developing a control signal indicative of the relationship between the output of said up-down counting means and each of said time base control products; and means responsive to said means for comparing for producing said binary output signal such that the value thereof varies in dependence on the relationship between the output of said up-down counting means and said time base control products.

20. The tone source apparatus according to claim 19 wherein said factors characterizing said means for multiplying and said values characterizing said binary output signal are selected for imparting an approximately sinusoidal inflection to the data output of said latch means.

21. The tone source apparatus according to claim 20 wherein said means for operating said up-down counting means comprises means operable for operating said up-down counting means for enabling said binary output signal for modifying said second sub-instruction for causing the data output of said latch means to selectively assume approximate quarter cycle concave, quarter cycle convex, half-circle and "S-curve" sinusoidal inflections.

22. In a tone source apparatus for an electronic musical instrument of the type having a sequentially addressed memory means storing a plurality of waveform segment defining instructions, each of said instructions including a component representative of a selected parameter of the associated waveform segment, the improvement wherein said memory means comprises:

a first memory having a plurality of sequential memory address locations each storing one of said instructions including an address code representing said selected parameter component, at least some of said memory address locations storing identical ones of said address codes;

means for sequentially addressing the memory address locations of said first memory;

a second memory storing a plurality of said selected parameter components; and means coupling each address code stored at a sequentially addressed memory location of said first memory for addressing a single one of said parameter components stored in said second memory.

23. The improvement according to claim 22 wherein said stored parameter components are characterized by bit word lengths greater than said stored address codes.

24. A tone source apparatus for an electronic musical instrument comprising:

a source of clock pulses;

memory means storing a plurality of waveform segment defining instructions, each of said instructions including a selected constant value step size component;

means for addressing said memory means;

multiplier means operable for selectively modifying the step size component of an addressed waveform segment defining instruction;

control means for operating said multiplier means;

means responsive to said addressing means for resetting said control means in response to each newly addressed waveform segment defining instruction; and counting means responsive to said clock pulses for developing an output count signal incrementally changing in value in accordance with said modified step size signal for producing a sequence of waveform segment signals each characterized by a desired inflection.

25. The tone source apparatus according to claim 24 wherein said control means comprises means for developing a selected time variable function and wherein said multiplier means is operable for multiplying said time variable function with said step size signal.

* * * * *